(12) United States Patent
Morikawa et al.

(10) Patent No.: US 12,286,548 B2
(45) Date of Patent: *Apr. 29, 2025

(54) COATING AGENT, ADHESIVE, AND COATED PRODUCT

(71) Applicant: KURARAY CO., LTD., Kurashiki (JP)

(72) Inventors: Keisuke Morikawa, Houston, TX (US); Tatsuya Tanida, Frankfurt am Main (DE); Yuta Taoka, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 680 days.

This patent is subject to a terminal disclaimer.

(21) Appl. No.: 17/041,807

(22) PCT Filed: Mar. 25, 2019

(86) PCT No.: PCT/JP2019/012539
§ 371 (c)(1),
(2) Date: Sep. 25, 2020

(87) PCT Pub. No.: WO2019/189000
PCT Pub. Date: Oct. 3, 2019

(65) Prior Publication Data
US 2021/0009842 A1  Jan. 14, 2021

(30) Foreign Application Priority Data

Mar. 26, 2018 (JP) ................. 2018-057528

(51) Int. Cl.
| | | |
|---|---|---|
| C09D 129/04 | (2006.01) | |
| C08K 3/013 | (2018.01) | |
| C08K 5/00 | (2006.01) | |
| C09D 133/02 | (2006.01) | |
| C09J 129/04 | (2006.01) | |
| C09J 133/02 | (2006.01) | |
| D21H 19/20 | (2006.01) | |

(52) U.S. Cl.
CPC ............ *C09D 129/04* (2013.01); *C08K 3/013* (2018.01); *C08K 5/0025* (2013.01); *C09D 133/02* (2013.01); *C09J 129/04* (2013.01); *C09J 133/02* (2013.01); *D21H 19/20* (2013.01)

(58) Field of Classification Search
None
See application file for complete search history.

(56) References Cited

U.S. PATENT DOCUMENTS

| | | | | |
|---|---|---|---|---|
| 5,728,788 | A | * | 3/1998 | Takachi ................ C08F 18/08 |
| | | | | 526/216 |
| 9,873,984 | B2 | | 1/2018 | Kawagoe et al. |
| 10,988,606 | B2 | * | 4/2021 | Nii ....................... C08K 5/0016 |
| 2009/0176647 | A1 | | 7/2009 | Hada et al. |
| 2012/0329949 | A1 | * | 12/2012 | Watanabe ............... C08F 6/003 |
| | | | | 525/62 |
| 2016/0251466 | A1 | | 9/2016 | Kato et al. |
| 2016/0326285 | A1 | * | 11/2016 | Mori ......................... C08J 5/18 |
| 2017/0275394 | A1 | | 9/2017 | Mori et al. |
| 2017/0298216 | A1 | * | 10/2017 | Labeque ............ B65D 81/3261 |

FOREIGN PATENT DOCUMENTS

| | | | |
|---|---|---|---|
| CN | 106459252 A | 2/2017 | |
| CN | 106715493 A | 5/2017 | |
| EP | 639669 A1 * | 2/1995 | ............ D21H 19/20 |
| JP | 52-17070 B2 | 5/1977 | |
| JP | 52-86894 A | 7/1977 | |
| JP | 09208786 A * | 8/1997 | |
| JP | 09302024 A * | 11/1997 | |
| JP | 11-323795 A | 11/1999 | |
| JP | 2004-359795 A | 12/2004 | |
| JP | 2008-254436 A | 10/2008 | |
| JP | 2009-179888 A | 8/2009 | |
| JP | 2009185395 A * | 8/2009 | |
| JP | 2013-28712 A | 2/2013 | |
| JP | 2013028712 A * | 2/2013 | |
| JP | 2015-34247 A | 2/2015 | |
| JP | 2015-174920 A | 10/2015 | |
| WO | WO 2011/108152 A1 | 9/2011 | |

OTHER PUBLICATIONS

JP-09208786-A, Aug. 1997 (Year: 1997).*
JP 2013028712 A, Feb. 2013, Machine translation (Year: 2013).*
JP 2013028712 A, Feb. 2013, partial human translation (Year: 2013).*
JP-09208786-A, Aug. 1997, Machine translation (Year: 1997).*
JP-2009185395-A, Aug. 2009, Machine translation (Year: 2009).*
JP 09-302024 A, , Nov. 1997, machine translation (Year: 1997).*
International Search Report issued on Jun. 11, 2019 in PCT/JP2019/012539 filed on Mar. 25, 2019, 4 pages.

(Continued)

*Primary Examiner* — Satya B Sastri
(74) *Attorney, Agent, or Firm* — Oblon, McClelland, Maier & Neustadt, L.L.P.

(57) ABSTRACT

The present invention provides a coating agent having a reduced methanol content, an adhesive including the coating agent and excellent in coating performance and adhesiveness, and a coated product including the coating agent and excellent in water resistance and alcohol resistance. The present invention relates to a coating agent comprising a modified vinyl alcohol polymer (A), the modified vinyl alcohol polymer (A) comprising a structural unit derived from a derivative (a) of an ethylenically unsaturated dicarboxylic acid in a content (X) of 0.05 mol % or more and 10 mol % or less, having a degree of saponification of 80.0 mol % or more and 99.9 mol % or less, having a methanol content of less than 3.0 mass % as measured by headspace gas chromatography, and having an amount of 0.1 ppm or more and less than 2,000 ppm of a component insoluble in a 90° C., 5 mass % aqueous solution.

13 Claims, No Drawings

(56) References Cited

OTHER PUBLICATIONS

Moritani, T. et al., "Functional modification of poly(vinyl alcohol) by copolymerization: 1. Modification with carboxylic monomers," Polymer, vol. 38, No. 12, 1997, pp. 2933-2945.
Office Action issued Nov. 16, 2021 in corresponding Indian Patent Application No. 202017044155 (with English Translation), 7 pages.

\* cited by examiner

COATING AGENT, ADHESIVE, AND COATED PRODUCT

TECHNICAL FIELD

The present invention relates to: a coating agent including a certain modified vinyl alcohol polymer; an adhesive; and a coated product.

BACKGROUND ART

Vinyl alcohol polymer (which may hereinafter be abbreviated as "PVA") is a known water-soluble synthetic polymer. Vinyl alcohol polymer is used as a raw material of vinylon, a synthetic fiber, and is also widely used in applications such as paper processing, fiber processing, adhesives, stabilizers for emulsion polymerization and suspension polymerization, inorganic binders, and films. In particular, for paper processing, vinyl alcohol polymer is widely used in, for example, sizing agents, paper strengthening agents, dispersants for pigments, dyes, etc., binders of ink fixatives such as silica, gap fillers made of silicone, surface treatment agents for imparting gas barrier properties, grease resistance, light resistance, water resistance, etc., and additives for curtain coating.

Because of, for example, reactiveness, excellent properties as a dispersant, and strong interaction with acid paper, carboxylic acid-modified PVA, in particular, is used in water resistance-imparting agents, dye dispersants, etc. for thermal recording materials. For example, Patent Literature 1 discloses a thermal recording material in which a specific carboxylic acid-modified polyvinyl alcohol is used as a dye dispersant.

In order to introduce carboxylic acid or a derivative thereof into PVA, for example, a vinyl ester monomer is copolymerized with a monomer containing carboxylic acid or a derivative thereof, and the resulting vinyl ester copolymer is saponified. Derivatives of ethylenically unsaturated dicarboxylic acids have high reactivity with vinyl ester monomers, and are used for efficient introduction of carboxylic acid. Derivatives of maleic acid and fumaric acid are known to be used from the viewpoint of their industrial availability. Because ethylenically unsaturated dicarboxylic acids such as maleic acid and fumaric acid have poor solubility for vinyl ester monomers, monomers, such as monoesters, diesters, and anhydrides of ethylenically unsaturated dicarboxylic acids, that have excellent solubility for vinyl ester monomers are used in solution polymerization.

A PVA as described above into which carboxylic acid or a derivative thereof has been introduced is typically produced by saponification in the presence of an alkali catalyst added to a methanol solution of vinyl acetate polymer obtained through radical polymerization of vinyl acetate in methanol solvent. Accordingly, a modified PVA obtained by drying inherently contains residual methanol from the solvent. When such a polymer containing residual methanol is included in a coating agent, a problem arises in that methanol is released into the atmosphere in a step of dissolving the polymer and a step of coating with a solution of the polymer, and improvement has thus been required in the viewpoint of working environment. The methods in Patent Literatures 2 to 4 have been proposed to solve the problem.

Patent Literatures 2 and 3 disclose a technique that supplies a hydrous gas during drying to replace an organic volatile component in a PVA with moisture, and thereby efficiently remove the organic volatile component. However, a PVA containing a structural unit derived from a monoester, a diester, or an anhydride of an ethylenically unsaturated dicarboxylic acid has high affinity and high solubility for water, and supplying a hydrous gas causes the PVA particles to dissolve on their surfaces and fuse one another to form blocks in the process of drying. This makes it difficult to run the PVA through the step, and the technique is not easily applicable to the PVA.

Patent Literature 4 proposes a technique whereby PVA is washed with a washing solution primarily containing an alcohol having 2 to 3 carbon atoms to efficiently reduce the methanol content. However, the use of an alcohol having 2 to 3 carbon atoms, which has a higher boiling point and a higher latent heat of vaporization than methanol, requires a larger amount of heat and a longer time for drying and so far involves some industrial issues such as increased manufacturing costs.

In normal situations, a methanol component can be removed by prolonged heating and drying at high temperature, instead of using a drying technique such as above. However, such procedures consume large energy and require a sacrifice of industrial production efficiency. Additionally, in the case of a PVA containing a structural unit derived from a derivative of an ethylenically unsaturated dicarboxylic acid (for example, a monoester, a diester, or an anhydride), a water-insoluble component is yielded as a result of a crosslinking reaction that takes place between the structural moiety derived from the monoester, diester, or anhydride and the hydroxyl moiety of the PVA at high temperature, as described in Non Patent Literature 1. When an aqueous solution of the PVA is produced and used as a coating agent, problems such as a dirty roll and filter clogging may occur, coating performance and adhesiveness may decrease, and the water resistance of coated products obtained using the coating agent may decrease. Therefore, it has been considered practically difficult to reduce generation of a water-insoluble component in a PVA as described above while reducing the methanol content. Because of such properties, the method of Patent Literature 4 is also not easily applicable because the technique requires a larger than normal amount of heat and time for drying.

CITATION LIST

Patent Literature

Patent Literature 1: JP 2008-254436 A
Patent Literature 2: JP S52(1977)-17070 B
Patent Literature 3: JP H9(1997)-302024 A
Patent Literature 4: JP 2013-28712 A

Non Patent Literature

Non Patent Literature 1: Polymer Vol. 38, No. 12, pp. 2933-2945, 1997

SUMMARY OF INVENTION

Technical Problem

The present invention aims to provide a coating agent including a certain modified vinyl alcohol polymer, having a reduced methanol content in the modified vinyl alcohol polymer, and having a reduced amount of a component that does not dissolve when the modified vinyl alcohol polymer is dissolved in water. It is also an object of the present invention to provide an adhesive including the coating agent and excellent in coating performance and adhesiveness and a coated product including the coating agent and excellent in water resistance and alcohol resistance.

Solution to Problem

As a result of intensive studies to find a solution to the foregoing problems, the present inventors have produced, by using ingenuity to the particle diameter and to pre-drying washing conditions, a modified vinyl alcohol polymer having a residual methanol content of less than 3.0 mass % and having an amount of 0.1 ppm or more and less than 2,000 ppm of a component that does not dissolve when the modified vinyl alcohol polymer is dissolved in water even when a structural unit derived from a derivative of an ethylenically unsaturated dicarboxylic acid has been introduced. A coating agent including the modified vinyl alcohol polymer has completed the present invention.

Specifically, the present invention relates to the following.

[1] A coating agent, comprising a modified vinyl alcohol polymer (A), the modified vinyl alcohol polymer (A) comprising a structural unit derived from a derivative (a) of an ethylenically unsaturated dicarboxylic acid in a content (X) of 0.05 mol % or more and 10 mol % or less, having a degree of saponification of 80.0 mol % or more and 99.9 mol % or less, having a methanol content of less than 3.0 mass % as measured by headspace gas chromatography, and having an amount of 0.1 ppm or more and less than 2,000 ppm of a component insoluble in a 90° C., 5 mass % aqueous solution.

[2] The coating agent according to [1], wherein the derivative (a) of an ethylenically unsaturated dicarboxylic acid is a monoester, a diester, or an anhydride of an ethylenically unsaturated dicarboxylic acid.

[3] The coating agent according to [1] or [2], wherein at least a part of the structural unit derived from the derivative (a) of an ethylenically unsaturated dicarboxylic acid is a structural unit represented by the following formula (I),

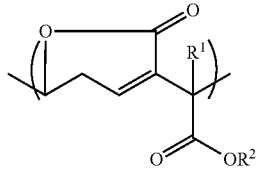

wherein $R^1$ is a hydrogen atom or a linear or branched alkyl group having 1 to 8 carbon atoms, and $R^2$ is a metal atom, a hydrogen atom, or a linear or branched alkyl group having 1 to 8 carbon atoms, and
the following formula (Q) is satisfied, $$0.05 \leq Y/X < 0.98 \qquad (Q),$$

wherein X is the content of the structural unit derived from the derivative (a) of an ethylenically unsaturated dicarboxylic acid, and Y is the content of the structural unit represented by the formula (I).

[4] The coating agent according to any one of [1] to [3], further comprising a crosslinking agent (B).

[5] The coating agent according to any one of [1] to [4], further comprising a filler (C).

[6] An adhesive comprising the coating agent according to any one of [1] to [5].

[7] A coated product made by coating a substrate with the coating agent according to any one of [1] to [5].

[8] The coated product according to [7], being a thermal recording material.

[9] The coated product according to [7], being base paper for release paper.

[10] The coated product according to [7], being a greaseproof paper.

[11] The coated product according to [7], being an inkjet recording material.

Advantageous Effects of Invention

Having a reduced methanol content, the coating agent of the present invention is environmentally friendly. Moreover, having a reduced amount of a component insoluble in the aqueous solution, the coating agent of the present invention has excellent coating performance and adhesiveness. A coated product made by coating a substrate with the coating agent has excellent water resistance and alcohol resistance.

DESCRIPTION OF EMBODIMENTS

<Coating Agent>

The coating agent of the present invention includes a modified vinyl alcohol polymer (A) (which may hereinafter be abbreviated as "modified PVA (A)") including a structural unit derived from a derivative (a) of an ethylenically unsaturated dicarboxylic acid in a content (X) of 0.05 mol % or more and 10 mol % or less, having a degree of saponification of 80.0 mol % or more and 99.9 mol % or less, having a methanol content of less than 3.0 mass % as measured by headspace gas chromatography, and having an amount of 0.1 ppm or more and less than 2,000 ppm of a component insoluble in a 90° C., 5 mass % aqueous solution.

The coating agent of the present invention is preferably a solution containing the modified PVA (A) dissolved in a solvent containing water as its primary component. The concentration of the modified PVA (A) in the solution is not particularly limited, and is preferably 0.01 mass % or more and 50 mass % or less, more preferably 0.1 mass % or more and 45 mass % or less, even more preferably 1 mass % or more and 40 mass % or less. If the concentration of the modified PVA (A) is less than 0.01 mass %, drying carried out after coating a substrate with the coating agent tends to be an excessively heavy burden. On the other hand, if the concentration of the modified PVA (A) is more than 50 mass %, the coating agent has an excessively high viscosity, which sometimes makes it difficult to handle the coating agent.

[Modified PVA (A)]

Importantly, the modified PVA (A) contains a structural unit derived from a derivative (a) of an ethylenically unsaturated dicarboxylic acid in a content (X) of 0.05 mol % or more and 10 mol % or less, preferably 0.1 mol % or more and 8 mol % or less, more preferably 0.2 mol % or more and 6 mol % or less, even more preferably 0.3 mol % or more and 6.0 mol % or less, particularly preferably 0.4 mol % or more and 6.0 mol % or less. The content (X) of the structural unit derived from the derivative (a) of an ethylenically unsaturated dicarboxylic acid may be 1.5 mol % or more or 2.5 mol % or more. If the content (X) of the structural unit derived from the derivative (a) of an ethylenically unsaturated dicarboxylic acid is less than 0.05 mol %, the amount of carboxylic acid introduced is too low to impart sufficient water resistance to a coated product. If the content (X) is more than 10 mol %, excessively high water solubility may cause handling problems, for example, formation of blocks due to adhesion of the modified PVA (A) in the presence of moisture in air. Moreover, if the content (X) is more than 10 mol %, crosslinkage carried out to produce the modified PVA (A) increases the amount of a component insoluble in the aqueous solution. When the resulting modified PVA (A) is included in a coating agent, the coating performance and adhesiveness of the coating agent and the water resistance of a coated product obtained with the coating agent are insufficient. The content (X) of the structural unit derived from the derivative (a) of an ethylenically unsaturated dicarboxylic acid can be calculated by $^1$H-NMR analysis of a vinyl ester copolymer before saponification.

In this specification, the upper and lower limits of numerical ranges (e.g., contents of components, and calculated values and various properties of components) may be combined as appropriate.

Importantly, the modified PVA (A) has a degree of saponification of 80.0 mol % or more and 99.9 mol % or less, preferably 82.0 mol % or more and 99.9 mol % or less, more preferably 85.0 mol % or more and 99.9 mol % or less. With a degree of saponification of less than 80.0 mol %, practical properties such as the coating performance and adhesiveness and the water resistance and strength of a coated product are insufficient. It is practically difficult to produce the modified PVA (A) having a degree of saponification of more than 99.9 mol %. The degree of saponification of the modified PVA (A) can be measured following the method described in JIS K 6726: 1994.

The viscosity-average degree of polymerization (hereinafter, referred to simply as "degree of polymerization") of the modified PVA (A) is not particularly limited, and is preferably 100 or more and 5,000 or less, more preferably 150 or more and 4,500 or less, even more preferably 200 or more and 4,000 or less. When the modified PVA (A) has a viscosity-average degree of polymerization equal to or more than the above lower limit, the coating agent including the modified PVA (A) has increased coating performance and adhesiveness and a coated product produced with the coating agent has increased strength and water resistance. When the modified PVA (A) has a viscosity-average degree of polymerization equal to or less than the above upper limit, the productivity of the modified PVA (A) is increased. The degree of polymerization of the modified PVA (A) can be measured following the method described in JIS K 6726: 1994.

Importantly, the methanol content in the modified PVA (A) is less than 3.0 mass %, preferably less than 2.5 mass %, more preferably less than 2.0 mass %, even more preferably less than 1.0 mass % as measured by headspace gas chromatography of 500 mg of the modified PVA (A), from the viewpoint of reducing an environmental burden caused by the use of the modified PVA (A) as a coating agent.

The methanol content in the modified PVA (A) is determined by headspace gas chromatography in the manner described below.

<Creation of Standard Curve>

Three aqueous solutions of known methanol contents are prepared using isopropanol as an internal standard. A standard curve is created by measuring these aqueous solutions with a gas chromatography device (GC-2010, manufactured by Shimadzu Corporation) installed with a headspace sampler (Turbo Matrix HS40, manufactured by Parkin Elmer).

<Measurement of Methanol Content in Modified PVA (A)>

Distilled water is taken into a 1,000 mL-graduated flask by filling it to a marked line, and 0.1 mL of isopropanol as an internal standard solution is added with a graduated pipette. The mixture is then thoroughly stirred. This solution will be called "solvent". Thereafter, 500 mg of the modified PVA (A) is weighed out into a vial container for headspace gas chromatography measurement, and, after putting a stir bar, the solvent is charged into the vial container in a measured amount of 10 mL using a volumetric pipette. After placing and securely locking a cap on the vial container, the vial container is placed on a hot stirrer, and the modified PVA (A) is dissolved under heat. The modified PVA (A) is subjected to headspace gas chromatography measurement after visually confirming that the modified PVA (A) has completely dissolved. The methanol content in the modified PVA (A) is then determined from the standard curve previously created.

The modified PVA (A) has an amount (hereinafter, also referred to simply as "amount of a component insoluble in the aqueous solution") of 0.1 ppm or more and less than 2,000 ppm, more preferably 0.1 ppm or more and less than 1,500 ppm, even more preferably 0.1 ppm or more and less than 1,000 ppm, particularly preferably 0.1 ppm or more and less than 500 ppm of a component insoluble in a 90° C., 5 weight % aqueous solution. It is practically impossible to produce the modified PVA (A) having an amount of less than 0.1 ppm of a component insoluble in the aqueous solution. When the amount of a component insoluble in the aqueous solution is 2,000 ppm or more, the coating performance of an adhesive obtained using the modified PVA (A) tends to decrease, or the water resistance of a coated product obtained using the modified PVA (A) tends to decrease. As used herein, "ppm" means "ppm by mass," and the term "amount of a component insoluble in the aqueous solution" means, as described in EXAMPLES below, the amount of undissolved, remaining particles (water-insoluble component) in ppm by mass with respect to all the modified PVA (A) used to prepare the aqueous solution.

The amount of a component insoluble in the aqueous solution is determined as follows. A 500-mL flask fitted with an agitator and a reflux condenser is placed in a 20° C. water bath. 285 g of distilled water is charged into the flask, followed by stirring at 300 rpm. 15 g of the modified PVA (A) is weighed out and is gradually charged into the flask. As soon as all the modified PVA (A) (15 g) is charged into the flask, the water bath temperature is increased to 90° C. over a time period of about 30 minutes. After the temperature reaches 90° C., the modified PVA (A) is further dissolved while stirring the mixture for 60 minutes at 300 rpm. The mixture is then filtered through a metal filter with 63-μm openings to trap undissolved, remaining particles (undissolved particles). The filter is thoroughly washed with 90° C. hot water to remove the solution on the filter. The filter is then dried for 1 hour with a heating drier at 120° C. The mass of the undissolved particles thus collected is determined as the amount of a component insoluble in the aqueous solution.

The derivative (a) of an ethylenically unsaturated dicarboxylic acid, the derivative (a) being used in the present invention as a base for the structural unit included in the modified PVA (A), is not particularly limited as long as it is not detrimental to the effect of the present invention. The derivative (a) of an ethylenically unsaturated dicarboxylic acid is preferably a monoester, a diester, or an anhydride of an ethylenically unsaturated dicarboxylic acid. Specific examples of the derivative (a) of an ethylenically unsaturated dicarboxylic acid esters include: monoalkyl unsaturated dicarboxylic acid esters such as monomethyl maleate, monoethyl maleate, monomethyl fumarate, monoethyl fumarate, monomethyl citraconate, monoethyl citraconate, monomethyl mesaconate, monoethyl mesaconate, monomethyl itaconate, and monoethyl itaconate; dialkyl unsaturated dicarboxylic acid esters such as dimethyl maleate, diethyl maleate, dimethyl fumarate, diethyl fumarate, dimethyl citraconate, diethyl citraconate, dimethyl mesaconate, diethyl mesaconate, dimethyl itaconate, and diethyl itaconate; and anhydrides of unsaturated dicarboxylic acids, such as maleic anhydride and citraconic anhydride. Among these, from the viewpoints of industrial availability and reactivity with a vinyl ester monomer (b), maleic acid monoalkyl esters, maleic acid dialkyl esters, maleic anhydride, fumaric acid monoalkyl esters, and fumaric acid dialkyl esters are preferred, and monomethyl maleate and maleic anhydride are particularly preferred. The modified PVA (A) is required to have a structural unit derived from at least one of the above derivatives (a) of ethylenically unsaturated dicarboxylic acids, and can have a structural unit derived from two or more of the above derivatives (a) of ethylenically unsaturated dicarboxylic acids.

From the viewpoint of reducing the amount of a component insoluble in the aqueous solution, it is preferable that at least a part of the structural unit derived from the derivative (a) of an ethylenically unsaturated dicarboxylic acid be a structural unit represented by the following formula (I),

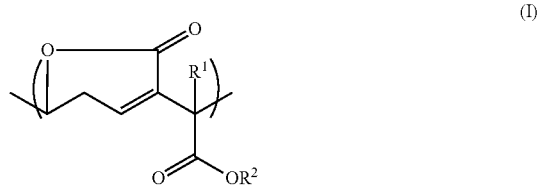

(I)

wherein $R^1$ is a hydrogen atom or a linear or branched alkyl group having 1 to 8 carbon atoms, and $R^2$ is a metal atom, a hydrogen atom, or a linear or branched alkyl group having 1 to 8 carbon atoms, and that the following formula (Q) be satisfied, $$0.05 \leq Y/X < 0.98 \qquad (Q),$$

wherein X is the content of the structural unit derived from the derivative (a) of an ethylenically unsaturated dicarboxylic acid (hereinafter, also referred to as "modifying content (X)"), and Y is the content of the structural unit represented by the formula (I) (hereinafter, also referred to as "modifying content (Y)"). With Y/X satisfying the range represented by the formula (Q), the modified PVA (A) having a reduced amount of a component insoluble in the aqueous solution can easily be produced industrially. The lower limit of Y/X is preferably 0.06 or more. The upper limit of Y/X is preferably 0.80 or less, even more preferably 0.60 or less, particularly preferably 0.40 or less. The content (Y) of the structural unit represented by the formula (I) is the ratio of the number of moles of the structural unit of the formula (I) to the total number of moles of a monomer unit constituting the main chain of the modified PVA (A).

Examples of the linear or branched alkyl group having 1 to 8 carbon atoms and represented by $R^1$ and $R^2$ include methyl, ethyl, n-propyl, isopropyl, n-butyl, isobutyl, sec-butyl, 2-methylpropyl, tert-butyl, n-pentyl, isopentyl, sec-pentyl, neopentyl, tert-pentyl, 1-ethylpropyl, 1,1-dimethylpropyl, 1,2-dimethylpropyl, n-hexyl, 1-methylpentyl, 2-methylpentyl, 3-methylpentyl, 4-methylpentyl (isohexyl), 1-ethylbutyl, 2-ethylbutyl, 1,1-dimethylbutyl, 1,2-dimethylbutyl, 1,3-dimethylbutyl, 1,4-dimethylbutyl, 2,2-dimethylbutyl, 2,3-dimethylbutyl, 3,3-dimethylbutyl, 1-ethyl-2-methyl-propyl, 1,1,2-trimethylpropyl, n-heptyl, 2-methylhexyl, n-octyl, isooctyl, tert-octyl, 2-ethylhexyl, and 3-methylheptyl. The alkyl group has preferably 1 to 6 carbon atoms, more preferably 1 to 4 carbon atoms, even more preferably 1 to 3 carbon atoms.

Examples of the metal atom represented by $R^2$ include alkali metals such as sodium, potassium, rubidium, and cesium; and alkali earth metals such as calcium, barium, strontium, and radium. Preferred among these are alkali metals, and sodium is more preferred.

In the case of the modified PVA (A) produced by using the derivative (a) of an ethylenically unsaturated dicarboxylic acid, the structural unit derived from the introduced derivative (a) of an ethylenically unsaturated dicarboxylic acid has been found to partly form the six-membered lactone ring structure represented by the formula (I) after saponification. The six-membered lactone ring structure represented by the formula (I) opens its ring under heat, and forms a cross-linked unit by subsequently undergoing an intermolecular esterification reaction, as described in Non Patent Literature 1. This may increase the amount of a component insoluble in the aqueous solution of the modified PVA (A). That is, the crosslinking reaction can be said as being inhibited when the content (Y) of the structural unit represented by the formula (I) is higher than the content (X) of the introduced structural unit derived from the derivative (a) of an ethylenically unsaturated dicarboxylic acid. It is thought that the six-membered lactone ring structure of the formula (I) is detected at 6.8 to 7.2 ppm in a $^1$H-NMR spectrum measured using a deuterated dimethyl sulfoxide solvent. In order for the modified PVA (A) to have an amount of less than 2,000 ppm of a component insoluble in the aqueous solution, the content (Y) of the structural unit represented by the formula (I) preferably satisfies the formula (Q) with respect to the content (X), which is determined from the vinyl ester copolymer before saponification, of the structural unit derived from the derivative (a) of an ethylenically unsaturated dicarboxylic acid. When Y/X is 0.50 in the formula (Q), it means that a half of all the introduced structural units derived from the derivative (a) of an ethylenically unsaturated dicarboxylic acid forms the structural unit represented by the formula (I).

The particle diameter of the particles constituting the modified PVA (A) is not particularly limited It is, however, preferable that 95 mass % or more of all the modified PVA (A) pass through a sieve with 1.00-mm openings, more preferably a sieve with 710-μm openings, particularly preferably a sieve with 500-μm openings. Here, "95 mass % or more of all the modified PVA (A)" means that, for example, 95 mass % or more of the particles of the modified PVA (A) pass through a sieve with 1.00-mm openings in terms of a cumulative particle size distribution. When less than 95 mass % of the particles pass through a sieve with 1.00-mm openings, the methanol incorporated in the modified PVA (A) does not easily vaporize, and the methanol content may exceed 3.0 mass %. Another possibility is that the large particle size may cause, for example, uneven drying and increase the amount of a component insoluble in the aqueous solution. The amount of modified PVA (A) particles that pass through a sieve with 500-μm openings is not particularly limited and is preferably 30 mass % or more, more preferably 35 mass %, even more preferably 45 mass % or more, particularly preferably 56 mass % or more of all the modified PVA (A). The particle diameter of the particles constituting the modified PVA (A) is preferably such that 99 mass % or more of the modified PVA (A) pass through a sieve with 1.00-mm openings, and is particularly preferably such that 99 mass % or more of the modified PVA (A) pass through a sieve with 1.00-mm openings and 56 mass % or more pass through a sieve with 500-μm openings. The sieve opening complies with the nominal opening W of JIS Z 8801-1: 2006.

[Crosslinking Agent (B)]

The coating agent of the present invention preferably further includes a crosslinking agent (B). When the coating agent further includes the crosslinking agent (B), the modified PVA (A) is cross-linked via the crosslinking agent (B). This further increases the coating performance and adhesiveness of the coating agent and an adhesive obtained with the coating agent and the water resistance of a coated product obtained with the coating agent.

The crosslinking agent (B) is not particularly limited as long as the modified PVA (A) is cross-linked. Examples of the crosslinking agent (B) include glyoxal, urea resin, melamine resin, polyvalent metal salts, polyvalent isocyanates, epichlorohydrin resins (such as polyamide-epichlorohydrin resin, polyamine-epichlorohydrin resin, and polyamide-polyamine-epichlorohydrin resin), boric acid, and borax. Among these, polyvalent metal salts, epichlorohydrin resins, and boric acid are preferred from the viewpoints of safety, economic efficiency, and reactivity. One of these crosslinking agents (B) may be used alone, or two or more thereof may be used in combination. The content of the crosslinking agent (B) in the coating agent of the present invention is preferably 1 to 80 parts by mass, more preferably 5 to 60 parts by mass, even more preferably 10 to 50 parts by mass with respect to 100 parts by mass of the modified PVA (A).

[Additional Component]

The coating agent of the present invention may include an additional component as long as the gist of the present invention is not impaired. Examples of the additional component include a filler (C), dispersants, water-soluble polymers other than the modified PVA (A), synthetic resin emulsions, plasticizers, pH adjusters, anti-foaming agents, mold release agents, surfactants, antiseptic agents, dyes, and pigments.

Examples of the filler (C) include kaolin, clay, baked clay, calcium carbonate, titanium oxide, diatomite, ammonium oxide, aluminum hydroxide, synthetic magnesium silicate, fine polystyrene particles, fine polyvinyl acetate particles, fine urea-formalin resin particles, precipitated silica, silica gel, silica synthesized by a gas-phase method, colloidal silica, colloidal alumina, pseudoboehmite, talc, zeolite, alumina, zinc oxide, satin white, and organic pigments. One of these fillers (C) may be used alone, or two or more thereof may be used in combination. The content of the filler (C) in the coating agent of the present invention is preferably 30 to 600 parts by mass, more preferably 50 to 500 parts by mass, even more preferably 100 to 400 parts by mass with respect to 100 parts by mass of the modified PVA (A).

Examples of the dispersant include sodium pyrophosphate, sodium hexametaphosphate, and sodium polyacrylate.

Examples of the water-soluble polymer include modified polyvinyl alcohols other than the modified PVA (A), unmodified polyvinyl alcohols, polyacrylamide, polyacrylic acid, carboxymethyl cellulose, hydroxyethyl cellulose, hydroxymethylpropylcellulose, casein, oxidized starch, polyethyleneimine, and polyallylamine.

Examples of the synthetic resin emulsion include a styrene-butadiene copolymer latex, polyacrylic acid emulsion, polymethacrylic acid ester emulsion, polyvinyl acetate emulsion, vinyl acetate-ethylene copolymer emulsion, and vinyl acetate-acrylic acid ester copolymer emulsion.

Examples of the plasticizer include glycols and glycerin. Examples of the pH adjuster include citric acid, fumaric acid, acetic acid, ammonia, caustic soda, sodium carbonate, and phosphoric acid.

[Method for Producing Modified PVA (A)]

A method for producing the modified PVA (A) included in the coating agent of the present invention will be described below in detail. It is to be noted that the present invention is not limited to the embodiments described below.

The modified PVA (A) is produced by, for example, a method including the steps of:

copolymerizing the derivative (a) of an ethylenically unsaturated dicarboxylic acid with a vinyl ester monomer (b) to obtain a vinyl ester copolymer;

saponifying the vinyl ester copolymer in a solvent with an alkali catalyst or an acid catalyst; and washing and drying the vinyl ester copolymer.

Examples of the vinyl ester monomer (b) include vinyl formate, vinyl acetate, vinyl propionate, vinyl valerate, vinyl caprate, vinyl laurate, vinyl stearate, vinyl benzoate, vinyl pivalate, and vinyl versatate. Particularly preferred is vinyl acetate.

Copolymerization of the derivative (a) of an ethylenically unsaturated dicarboxylic acid with the vinyl ester monomer (b) is achieved by a known method, such as bulk polymerization, solution polymerization, suspension polymerization, or emulsion polymerization. Among these, bulk polymerization, which requires no solvent, or solution polymerization, which requires a solvent such as an alcohol is typically employed. From the viewpoint of enhancing the effect of the present invention, solution polymerization is preferred which requires a lower alcohol, such as methanol, for polymerization. When the polymerization reaction is carried out by bulk polymerization or solution polymerization, the reaction may be batch or continuous.

An initiator used for the polymerization reaction is not particularly limited as long as the effect of the present invention is not impaired. For example, various known initiators may be used, including azo initiators such as 2,2'-azobis(isobutyronitrile), 2,2'-azobis(2,4-dimethylvaleronitrile), and 2,2'-azobis(4-methoxy-2,4-dimethylvaleronitrile); and organic peroxide initiators such as benzoyl peroxide, and n-propyl peroxycarbonate. The polymerization temperature in the polymerization reaction is not particularly limited, and may be 5 to 200° C., or 30 to 150° C.

In copolymerization of the derivative (a) of an ethylenically unsaturated dicarboxylic acid with the vinyl ester monomer (b), a copolymerizable monomer (c) may be added and polymerized, as required, in addition to the derivative (a) of an ethylenically unsaturated dicarboxylic acid and the vinyl ester monomer (b) as long as the effect of the present invention is not impaired. Examples of the additional monomer (c) include:

α-olefins such as ethylene, propylene, 1-butene, isobutene, and 1-hexene;

acrylamide derivatives such as acrylamide, N-methyl acrylamide, and N-ethyl acrylamide;

methacrylamide derivatives such as methacrylamide, N-methyl methacrylamide, and N-ethyl methacrylamide;

vinyl ethers such as methyl vinyl ether, ethyl vinyl ether, n-propyl vinyl ether, isopropyl vinyl ether, and n-butyl vinyl ether;

hydroxyl-containing vinyl ethers such as ethylene glycol vinyl ether, 1,3-propanediol vinyl ether, and 1,4-butanediol vinyl ether;

allyl ethers such as propyl allyl ether, butyl allyl ether, and hexyl allyl ether;

monomers having an oxyalkylene group;

hydroxyl-containing α-olefins such as isopropenyl acetate, 3-buten-1-ol, 4-penten-1-ol, 5-hexen-1-ol, 7-octen-1-ol, 9-decen-1-ol, and 3-methyl-3-buten-1-ol;

monomers having a silyl group, such as vinyltrimethoxysilane, vinylmethyldimethoxysilane, vinyldimethylmethoxysilane, vinyltriethoxysilane, vinylmethyldiethoxysilane, vinyklimethylethoxysilane, 3-(meth)acrylamidepropyltrimethoxysilane, and 3-(meth)acrylamidepropyltriethoxysilane; and N-vinylamide monomers such as N-vinylformamide, N-vinylacetamide, N-vinyl-2-pyrrolidone, and N-vinyl-2-caprolactam. The amount of the additional monomer (c) used depends on its purpose of use, applications, etc., and the proportion of the additional monomer (c) to all monomers used for copolymerization is typically 10 mol % or less, preferably 5.0 mol % or less, more preferably 3.0 mol % or less, even more preferably 2.0 mol % or less.

The modified PVA (A) can be obtained after the vinyl ester copolymer obtained in the above manner is subjected to the step of saponification in a solvent, the washing step, and the drying step. The saponification and drying conditions under which the modified PVA (A) is obtained are not particularly limited. It is, however, preferable that the water content of a raw saponification solution and the temperature of the PVA resin in the drying process or the drying time be confined in specific ranges so that the methanol content in the modified PVA (A) and the amount of a component insoluble in the aqueous solution can be reduced.

The raw saponification solution can be prepared by adding a small amount of water to the solution obtained in the copolymerization step and containing the vinyl ester copolymer and the solvent. The amount of water is preferably adjusted so that the water content of the raw saponification solution will be more than 1.0 mass % and less than 5.0 mass %. The water content is more preferably 1.5 to 4.0 mass %. If the water content is 1.0 mass % or less, the alkali catalyst does not easily deactivate itself and may act to catalyze crosslinking, which may result in an increase in the amount of a component insoluble in the aqueous solution in the drying process. If the water content is 5.0 mass % or more, a problem may be caused in the manufacturing process in that the rate of the saponification reaction may decrease or the modified PVA (A), which easily dissolves in water, may dissolve into the saponification reaction solution.

The solvent usable for the saponification reaction may be, for example, methanol, ethanol, isopropanol, methyl acetate, dimethyl sulfoxide, diethylsulfoxide, or dimethylformamide. The solvent used is not particularly limited, and one of these solvents may be used alone, or two or more thereof may be used in combination. Among these solvents, methanol or a mixed solvent of methanol and methyl acetate is used preferably.

An alkali catalyst is typically used as the catalyst for the saponification reaction of the vinyl ester copolymer. Examples of the alkali catalyst include hydroxides of alkali metals, such as potassium hydroxide and sodium hydroxide; and alkoxides of alkali metals, such as sodium methoxide. Preferred is sodium hydroxide. The amount of the saponification catalyst used is preferably 0.005 to 0.50, more preferably 0.008 to 0.40, particularly preferably 0.01 to 0.30 in terms of a molar ratio with respect to the vinyl ester monomer unit of the vinyl ester copolymer. The saponification catalyst may be added at once in an early stage of the saponification reaction, or may be added during the saponification reaction after adding a part of the saponification catalyst in an early stage of the saponification reaction.

The saponification reaction temperature is preferably 5 to 80° C., more preferably 20 to 70° C. The saponification reaction time is preferably 5 minutes to 10 hours, more preferably 10 minutes to 5 hours. The saponification reaction may be batch or continuous. In a saponification reaction using the alkali catalyst, the saponification reaction may be stopped by neutralizing any remaining catalyst by addition of an acid such as acetic acid or lactic acid, as required. However, neutralization by addition of an acid is preferably not carried out to reduce the amount of a component insoluble in the aqueous solution to less than 2,000 ppm, because any remaining acid after neutralization tends to facilitate an intermolecular crosslinking reaction in the modified PVA (A) in the drying process.

The saponification reaction method is not particularly limited as long as the method employed is a known method. Examples of the method include:

(1) a method in which the saponification catalyst is mixed with a solution prepared to have a concentration of the vinyl ester copolymer of more than 20 mass % and the resulting semi-solid (gelatinous material) or solid is pulverized with a pulverizer to obtain the modified PVA (A);

(2) a method in which the concentration of the vinyl ester copolymer dissolved in a solvent containing methanol is controlled to be less than 10 mass % to prevent the whole reaction solution from turning into a non-fluidic gelatinous solution and to precipitate the modified PVA (A) in the solvent in the form of fine particles dispersed in methanol; and (3) a method in which the vinyl ester copolymer is emulsified by adding a saturated hydrocarbon solvent or is saponified in a suspended phase to obtain the modified PVA (A). In the method (1), the pulverizer is not particularly limited, and a known pulverizer or comminutor can be used.

The method (1) or (2) in which no saturated hydrocarbon solvent is required is preferred from a production standpoint. The method (2) is more preferred from the standpoint of reducing the methanol content. In the method (1), the concentration of the vinyl ester copolymer in the vinyl ester copolymer solution is preferably 21 mass % or more, more preferably 25 mass % or more. The production method (2) is preferred because of its industrial advantage in terms of the fact that even when the subsequent washing and drying steps are carried out under milder conditions than conventionally performed, the methanol content is reduced and a component insoluble in the aqueous solution can be reduced to a trace amount. In the method (2), the vinyl ester copolymer dissolved in the solvent containing methanol and a partially saponified product of the vinyl ester copolymer have a concentration of preferably less than 8.0 mass %, more preferably less than 5.0 mass %, even more preferably less than 4.0 mass %.

The saponification step is preferably followed by the step of washing the modified PVA (A), as required, in order to make the methanol content of the modified PVA (A) less than 3.0 mass %. A solution containing a lower alcohol, such as methanol, as its primary component and further containing water and/or an ester such as methyl acetate can be used as a washing solution. The washing solution is preferably a solution containing methanol as its primary component and methyl acetate. It is preferable in terms of economy and the steps that methanol, which is suitably used in the copolymerization step of the vinyl ester copolymer, and methyl acetate generated in the saponification step be used as the washing solution, because, in this case, methanol and methyl acetate can be recycled in the steps and no other solvent needs to be prepared as a washing solution. In one embodiment, in the saponification reaction of the method (1), a part of the washing solvent may impregnate the PVA in the process of washing to replace methanol contained in the PVA. Accordingly, the content of methyl acetate in the washing solution is preferably 45 volume % or more, more preferably 60 volume % or more in order to achieve a methanol content of less than 3.0 mass % in the modified PVA (A) after drying. From the viewpoint of further reducing the amount of a component insoluble in the aqueous solution of the resulting modified PVA (A), the content of methyl acetate in the washing solution is even more preferably 70 volume % or more.

The modified PVA (A) can be obtained by drying the polymer after the saponification step or washing step. Specifically, the polymer is dried preferably by hot-air drying using a cylindrical drier, and the modified PVA (A) being dried has a temperature of preferably more than 80° C. and less than 120° C., more preferably 90° C. or more and less than 110° C. The drying time is preferably 2 to 10 hours, more preferably 3 to 8 hours. The drying conditions in these ranges are preferred to make it easier to achieve a methanol content of less than 3.0 mass % in the resulting modified PVA (A) and reduce the amount of a component insoluble in the aqueous solution to less than 2,000 ppm.

<Adhesive>

An adhesive including the coating agent of the present invention is also a preferred embodiment of the present invention. The adhesive more preferably includes the filler (C). The content of the filler (C) in the adhesive of the present invention is preferably 10 to 90 parts by mass, more preferably 20 to 80 parts by mass with respect to 100 parts by mass of the modified PVA (A). The adhesive is preferably used for paper, and examples of applications of the adhesive include facial tissue, paper tubes, cigarette paper, toilet paper, cardboard, and decorative paper. Another embodiment is an adhesive including the modified PVA (A), the crosslinking agent (B), and the filler (C).

<Coated Product>

A coated product formed by coating a substrate with the coating agent of the present invention is also a preferred embodiment of the present invention. Including the substrate having a surface coated with the coating agent, the coated product is excellent in water resistance and alcohol resistance. Examples of the coated product include a thermal recording material, base paper for release paper, greaseproof paper, and an inkjet recording material. That is, the coating agent of the present invention can be used in applications such as a thermal recording material, base paper for release paper, greaseproof paper, and an inkjet recording material. Moreover, the coating agent of the present invention can be used to coat a substrate to form an adhesive layer for bonding the substrate and another layer together. In this case, both the substrate and the other layer are preferably paper, so that the layer formed of the coating agent of the present invention is used as an adhesive layer bonding the pieces of paper together.

The substrate of the coated product can be appropriately chosen depending on the application, and examples of the application include paper (including synthetic paper), fabrics, wooden boards, and resin boards. Among these, paper is preferred in that, for example, the coating agent can penetrate the inside of the substrate to suitably enhance, for example, water resistance.

Examples of the paper include: paperboards such as manila boards, white chipboards, and linerboards; and printing paper such as common high-quality paper, medium-quality paper, and photogravure paper. Examples of the fabric include non-woven fabrics, woven fabrics, and knitted fabrics. Examples of the wooden board include solid wood, plywood, and glued laminated timber. Examples of the resin board include vinyl chloride boards and acrylic boards.

When the substrate is paper, the paper substrate may include papermaking aids such as organic and inorganic pigments, paper strengthening agents, sizing agents, retention aids, and surfactants.

The amount of the coating agent applied to coat the substrate is not particularly limited, and is typically about 0.1 $g/m^2$ to 30 $g/m^2$ on one surface of the substrate in terms of solid content.

A known method can be employed as the method for producing the coated product. Examples of a suitably employed coating method include gravure roll coating, reverse gravure coating, reverse roll coating, Meyer bar coating, curtain coating, size press, blade coating, knife coating, slot die, symsizer, and casting. When the substrate is paper, an optional method such as a drying step or calender step may be carried out, as required, after coating the substrate with the coating agent. The coating agent of the present invention can be suitably used as a viscosity modifier, an additive in curtain coating.

[Thermal Recording Material]

A thermal recording material is a coated product made by coating a substrate with the coating agent of the present invention. Including an overcoat layer formed by coating a substrate with the coating agent, the thermal recording material has high water resistance and is also excellent in strength, grease resistance, and printability.

Examples of the substrate of the thermal recording material include the papers mentioned as examples of the substrate of the coated product of the present invention, and among those, printing paper is preferred. The basis weight of the substrate of thermal recording paper is not particularly limited, and is preferably 10 to 100 $g/m^2$, more preferably 35 to 80 $g/m^2$ in consideration of, for example, handleability.

The coating agent of the present invention included in the thermal recording material preferably includes the filler (C). The content of the filler (C) is preferably 50 parts by mass or more and 300 parts by mass or less, more preferably 80 parts by mass or more and 250 parts by mass or less with respect to 100 parts by mass of the modified PVA (A). The solids concentration of the coating agent of the present invention included in the thermal recording material is, for example, 10 mass % or more and 65 mass % or less.

[Base Paper for Release Paper]

Base paper for release paper includes paper as its substrate and is a coated product made by coating the substrate with the coating agent of the present invention. The coating agent of the present invention forms a gap filling layer. Release paper can be produced by forming an adhesive layer on the gap filling layer with an adhesive. Since the base paper for release paper includes the coating agent, the gap filling layer has high water resistance and high grease resistance. The base paper for release paper can thus be suitably used, for example, for a self-adhesive label, self-adhesive tape, industrial self-adhesive paper, and mold release paper.

High-quality paper, medium-quality paper, alkaline paper, glassine paper, and semi-glassine paper are preferred as the paper substrate included in the base paper for release paper. Among these, semi-glassine paper is more preferred. A known adhesive can be used as an adhesive for forming the adhesive layer.

The basis weight of the substrate of the base paper for release paper is not particularly limited, and is preferably 10 to 120 g/m², more preferably 40 to 100 g/m² in consideration of, for example, gap filling property and handleability of the base paper for release paper.

The solids concentration of the coating agent of the present invention included in the base paper for release paper is, for example, 1 mass % or more and 15 mass % or less, preferably 2 mass % or more and 10 mass % or less.

[Greaseproof Paper]

Greaseproof paper includes paper as its substrate and is a coated product made by coating the substrate with the coating agent of the present invention. The coating agent of the present invention forms a greaseproof layer. Inducing the coating agent, the greaseproof paper has high grease resistance and is also excellent in strength and water resistance. Including the modified PVA (A), the coating agent is highly safe. Therefore, greaseproof paper can be suitably used as a packaging material, for example, for foods.

Examples of the substrate of the greaseproof paper include the papers mentioned as examples of the substrate of the coated product of the present invention. Among those, high-quality paper, medium-quality paper, alkaline paper, glassine paper, semi-glassine paper, cardboard base paper, white chipboard base paper, chipboard base paper, and the like can be suitably used.

The basis weight of the substrate of the greaseproof paper is not particularly limited. In consideration of, for example, grease resistance, the basis weight of the substrate of the greaseproof paper as wrapping is preferably 20 to 150 g/m² and the basis weight of the substrate of the greaseproof paper as a shaped container having a box shape is preferably 150 to 500 g/m².

[Inkjet Recording Material]

An inkjet recording material is a coated product made by coating a substrate with the coating agent of the present invention. In the inkjet recording material, the coating agent is preferably used as a binder for a filler, for example, an ink-receiving layer binder. In that case, the coating agent preferably includes the filler. The content of the filler is preferably 50 parts by mass or more and 300 parts by mass or less, more preferably 80 parts by mass or more and 250 parts by mass or less with respect to 100 parts by mass of the modified PVA (A). Examples of the substrate of the inkjet recording material include the papers mentioned as examples of the substrate of the coated product of the present invention.

The present invention encompasses embodiments obtainable by combining the above configurations in various manners within the technical idea of the present invention, as long as the effect of the present invention can be obtained.

EXAMPLES

The present invention will be described in more detail by way of Examples. It should be noted that the present invention is in no way limited to the Examples given below, and the present invention can be implemented in various modifications within the technical idea of the present invention by a person with common knowledge in the art. In the following Examples and Comparative Examples, "part" means "part by mass", and "%" means "mass %", unless otherwise specifically stated.

[Viscosity-Average Degree of Polymerization of Modified PVA (A)]

The viscosity-average degree of polymerization of the modified PVA (A) was measured following JIS K 6726: 1994. Specifically, when the degree of saponification was less than 99.5 mol % in the modified PVA (A), the modified PVA (A) was saponified until the degree of saponification became 99.5 mol % or more, and was measured for the viscosity-average degree of polymerization (P) by the following equation using the intrinsic viscosity [η] (liter/g) measured in water at 30° C.

$$P=([\eta]\times10^4/8.29)^{(1/0.62)}$$

[Degree of Saponification of Modified PVA (A)]

The degree of saponification of the modified PVA (A) was determined following the method described in JIS K 6726: 1994.

[Content (X) of Structural Unit Derived from Derivative (a) of Ethylenically Unsaturated Dicarboxylic Acid]

The content (X) was calculated from a spectrum of the modifying species by $^1$H-NMR spectral analysis.

[Content (Y) of Structural Unit Represented by Formula (I)]

The content (Y) was calculated from a signal detected at 6.8 to 7.2 ppm in $^1$H-NMR spectral analysis using a dimethyl sulfoxide solvent.

[Methanol Content in Modified PVA (A)]

The methanol content in the modified PVAs (A) of Examples and Comparative Examples was determined by headspace gas chromatography in the manner described below.

<Creation of Standard Curve>

Three aqueous solutions of known methanol contents are prepared using isopropanol as an internal standard. A standard curve is created by measuring these aqueous solutions with a gas chromatography device (GC-2010, manufactured by Shimadzu Corporation) installed with a headspace sampler (Turbo Matrix HS40, manufactured by Parkin Elmer).

<Measurement of Methanol Content in Modified PVA (A)>

Distilled water is taken into a 1,000 mL-graduated flask by filling it to a marked line, and 0.1 mL of isopropanol as an internal standard solution is added with a graduated pipette. The mixture is then thoroughly stirred. This solution will be called "solvent". Thereafter, 500 mg of each of the modified PVAs (A) of Examples and Comparative Examples is weighed out as a sample into a vial container for headspace gas chromatography measurement, and, after putting a stir bar, the solvent is charged into the vial container in a measured amount of 10 mL using a volumetric pipette. After placing and securely locking a cap on the vial container, the vial container is placed on a hot stirrer, and the modified PVA (A) sample is dissolved under heat. The modified PVA (A) is subjected to headspace gas chromatography measurement after visually confirming that the modified PVA (A) has completely dissolved. The methanol content in the modified PVA (A) is determined from the standard curve previously created.

[Amount of Component Insoluble in 90° C., 5 Mass% Aqueous Solution]

A 500-mL flask fitted with an agitator and a reflux condenser is placed in a 20° C. water bath. 285 g of distilled water is charged into the flask, followed by stirring at 300 rpm. 15 g of each of the modified PVAs (A) of Examples and Comparative Examples is weighed out and is gradually charged into the flask. As soon as all the modified PVA (A) (15 g) is charged into the flask, the water bath temperature is increased to 90° C. over a time period of about 30 minutes. After the temperature reaches 90° C., the modified PVA (A) is further dissolved while stirring the mixture for 60 minutes at 300 rpm. The mixture is then filtered through a metal filter with 63-pm openings to trap undissolved, remaining particles (undissolved particles). The filter is thoroughly washed with 90° C. hot water to remove the solution on the filter. The filter is then dried for 1 hour with a heating drier at 120° C. The mass of the undissolved particles thus collected is determined as the amount of a component insoluble in the aqueous solution.

[Particle Size Distribution]

The modified PVAs (A) obtained in Examples and Comparative Examples were measured for particle size distribution using the dry sieving method described in JIS Z 8815: 1994. Each of the modified PVAs (A) obtained in Examples and Comparative Examples was sieved through a sieve (filter) with 1.00-mm openings, and the mass of the modified PVA (A) having passed through the sieve was measured. The proportion (mass %) of the modified PVA (A) particles having passed through the sieve was then calculated from the mass of the modified PVA (A) before sieving. In a similar fashion, each of the modified PVAs (A) obtained in Examples and Comparative Examples was sieved through a sieve (filter) with 500-μm openings, and the mass of the modified PVA (A) having passed through the sieve was measured. The proportion (mass %) of the modified PVA (A) particles having passed through the sieve was then calculated from the mass of the modified PVA (A) before sieving. The opening complies with the nominal opening W of JIS Z 8801-1: 2006.

[Synthesis Example 1]

For copolymerization, an apparatus was used that had a reflux condenser, a raw-material supply line, a reaction-solution eject line, a thermometer, a nitrogen inlet, and stirring vanes, together with a polymerization container (continuous polymerization device; hereinafter, "polymerization vessel") equipped with a reflux condenser, a raw-material supply line, a thermometer, a nitrogen inlet, and stirring vanes. Vinyl acetate (VAM; 876 L/hr), methanol (MeOH; 157 L/hr), a 20% methanol solution (12.9 L/hr) of monomethyl maleate (MMM) as a modifying species being the derivative (a) of an ethylenically unsaturated dicarboxylic acid, and a 2% methanol solution (13.6 L/hr) of 2,2'-azobis(4-methoxy-2,4-dimethylvaleronitrile) (AMV) were continuously supplied into the polymerization vessel using a metering pump. The polymerization solution was continuously ejected from the polymerization vessel in such a way as to maintain a certain liquid level in the polymerization vessel. The polymerization rate of vinyl acetate was adjusted to be 43% in the polymerization solution ejected from the polymerization vessel. The polymerization solution was retained in the polymerization vessel for 4 hours. The polymerization solution ejected from the polymerization vessel had a temperature of 63° C. The polymerization solution ejected from the polymerization vessel was exposed to methanol vapor to remove unreacted vinyl acetate. A methanol solution of vinyl ester copolymer (PVAc; concentration: 35%) was thus obtained.

Water and methanol were added in desired amounts to the methanol solution of vinyl ester copolymer to prepare a raw saponification solution, specifically, a vinyl ester copolymer/methanol solution (concentration: 32 mass %) having a water content of 1.5 mass %. A sodium hydroxide/methanol solution (concentration: 4 mass %) as a saponification catalyzing solution was then added so that the molar ratio of sodium hydroxide to the vinyl acetate unit in the vinyl ester copolymer was 0.01. The raw saponification solution and the saponification catalyzing solution were mixed using a static mixer to obtain a mixture. The mixture was placed and kept on a belt under 40° C. temperature conditions for 18 minutes to promote a saponification reaction. The gel from the saponification reaction was pulverized, and impregnated with a washing solution having a methanol/methyl acetate ratio of 35/65 (volume ratio). The solution was then removed using a centrifugal dehydrator to obtain a polymer. The polymer (600 kg/hr; a resin component) was continuously supplied into a drier that had been adjusted to have a controlled inner temperature that brings the resin to 105° C. The polymer was retained in the drier for 6 hours on average. The polymer was then pulverized so as to pass through a filter with 1.00-mm openings. The modified PVA (A) (PVA-1) was thus obtained. The modified PVA (A) had a viscosity-average degree of polymerization of 1,700 and a degree of saponification of 88.0 mol %. The modifying contents (X) and (Y) were 0.4 mol % and 0.04 mol %, respectively, as measured by $^1$H-NMR spectral analysis, and the ratio (Y/X) was 0.10. The proportion of modified PVA (A) particles that passed through a filter with 1.00-mm openings was 99.0 mass %, and the proportion of modified PVA (A) particles that passed through a filter with 500-pm openings was 56.0 mass %, with respect to all the modified PVA (A). The methanol content in the PVA (A) was calculated to be 0.9 mass % by headspace gas chromatography described above, and the amount of a component insoluble in the aqueous solution (Amount of water-insoluble component) was 700 ppm as measured by the method described above. The analysis results for PVA-1 are presented in Table 2.

[Synthesis Examples 2 to 8]

PVA-2 to PVA-8 were obtained in the same manner as for the method for producing PVA-1 of Synthesis Example 1, except that the conditions were changed to those described in Table 1. The analysis results for the modified PVAs (A) are presented in Table 2.

TABLE 1

| | Modified PVA type | Polymerization conditions | | | | | | | Saponification conditions | | | Washing conditions Composition of washing solution | Drying conditions | |
|---|---|---|---|---|---|---|---|---|---|---|---|---|---|---|
| | | VAM (L/hr) | MeOH (L/hr) | AMV (L/hr) | Modifying species Type [1] | Concentration (mass %) | (L/hr) | Polymerization rate (%) | Retention time (hr) | PVAc/methanol solution (mass %) | Water content (mass %) | NaOH (molar ratio) | Methanol/methyl acetate (volume ratio) | Resin temperature (° C.) | Average retention time (hr) |
| Synthesis Example 1 | PVA-1 | 876 | 157 | 13.6 | MMM | 20 | 12.9 | 43 | 4 | 32 | 1.5 | 0.01 | 35/65 | 105 | 6 |
| Synthesis Example 2 | PVA-2 | 926 | 76 | 9 | MMM | 20 | 13.4 | 35 | 4 | 30 | 1.5 | 0.01 | 35/65 | 105 | 6 |
| Synthesis Example 3 | PVA-3 | 963 | 47 | 3 | MMM | 20 | 11 | 30 | 6 | 25 | 1.5 | 0.01 | 50/50 | 105 | 6 |
| Synthesis Example 4 | PVA-4 | 955 | 18 | 6 | DMM | 20 | 12 | 30 | 6 | 25 | 1.5 | 0.015 | 20/80 | 105 | 6 |
| Synthesis Example 5 | PVA-5 | 981 | 1 | 4 | MA | 50 | 35 | 25 | 8 | 25 | 1.5 | 0.10 | 20/80 | 105 | 6 |
| Synthesis Example 6 | PVA-6 | 810 | 220 | 4 | — | — | — | 40 | 4 | 32 | 1.5 | 0.008 | 35/65 | 105 | 6 |
| Synthesis Example 7 | PVA-7 | 963 | 47 | 3 | MMM | 20 | 11 | 30 | 6 | 25 | 1.5 | 0.01 | 100/0 | 105 | 6 |
| Synthesis Example 8 | PVA-8 | 963 | 47 | 3 | MMM | 20 | 11 | 30 | 6 | 25 | 1.5 | 0.01 | 100/0 | 120 | 4 |

[1] MMM: monomethyl maleate
DMM: dimethyl maleate
MA: maleic anhydride

TABLE 2

| | Modified PVA (A) | | | | | | | | |
|---|---|---|---|---|---|---|---|---|---|
| | | | | | | | | Particle size distribution | |
| | Modified PVA (A) type | Saponification degree (mol %) | Degree of polymerization | Modifying content (X) (mol %) | Modifying content (Y) (mol %) | Y/X | Methanol content (mass %) | Amount of water-insoluble component (ppm) | Particles passing through 1.00-mm openings (mass %) | Particles passing through 500-μm openings (mass %) |
| Synthesis Example 1 | PVA-1 | 88.0 | 1700 | 0.4 | 0.04 | 0.10 | 0.9 | 700 | 99.0 | 56.0 |
| Synthesis Example 2 | PVA-2 | 88.0 | 2400 | 0.5 | 0.05 | 0.10 | 1.5 | 1700 | 99.0 | 56.0 |
| Synthesis Example 3 | PVA-3 | 88.0 | 3200 | 0.4 | 0.03 | 0.08 | 1.3 | 1200 | 97.0 | 49.0 |
| Synthesis Example 4 | PVA-4 | 98.0 | 3500 | 0.4 | 0.09 | 0.23 | 0.9 | 40 | 96.0 | 44.0 |
| Synthesis Example 5 | PVA-5 | 96.0 | 3500 | 4.0 | 0.81 | 0.20 | 0.8 | 30 | 99.5 | 98.5 |
| Synthesis Example 6 | PVA-6 | 88.0 | 1700 | — | — | — | 1.5 | 10 | 99.0 | 56.0 |
| Synthesis Example 7 | PVA-7 | 88.0 | 3200 | 0.4 | 0.03 | 0.08 | 4.1 | 500 | 73.0 | 3.5 |
| Synthesis Example 8 | PVA-8 | 88.0 | 3200 | 0.4 | 0.07 | 0.18 | 1.1 | >5000 | 99.0 | 56.0 |

Example 1

(Preparation of Coating Agent)

Kaolin (product name: UW90; manufactured by Engelhald Corporation (today's BASF)) as the filler (C) was dispersed in water so that the concentration would be 40%, and the resulting mixture was mixed in a home blender for 10 minutes to prepare a dispersion. A coating agent was prepared by mixing the dispersion, an aqueous PVA-1 solution, and a crosslinking agent at a solid content ratio of 32 parts by mass of PVA-1 included in the aqueous solution to 60 parts by mass of kaolin as the filler (C) to 8 parts by mass of a polyamide-epichlorohydrin resin (WS4020, manufactured by SEIKO PMC CORPORATION) as the crosslinking agent (B). The concentration of PVA-1 in the coating agent was 5.8 mass %. The methanol content in the coating agent measured in the manner described below was 0.05 mass %.

(Production of Thermal Recording Material)

Commercially-available thermal paper (manufactured by KOKUYO Co., Ltd.; with no overcoat layer) was coated with the coating agent in an amount of 3.5 g/m$^2$ in terms of solid content using a curtain coater. This was followed by drying at 50° C. A thermal recording material including an overcoat layer formed of the coating agent was thus produced as a coated product. After the thermal recording material was stored at 40° C. and 50% RH for 2 days, the water resistance and alcohol resistance thereof were evaluated in the manner descried below. The results are presented in Table 3.

[Methanol Content in Coating Agent]

The methanol content in the coating agent was determined by headspace gas chromatography in the manner described below.

<Creation of Standard Curve>

Three aqueous solutions of known methanol contents are prepared using isopropanol as an internal standard. A standard curve is created by measuring these aqueous solutions with a gas chromatography device (GC-2010, manufactured by Shimadzu Corporation) installed with a headspace sampler (Turbo Matrix HS40, manufactured by Parkin Elmer).

<Measurement of Methanol Content in Coating Agent>

10 mg of the coating agent is weighed out and charged into a vial container. After placing and securely locking a cap on the vial container, the coating agent is subjected to headspace gas chromatography measurement. The methanol content in the coating agent is determined from the standard curve previously created.

[Evaluation of Water Resistance]

The thermal recording material was cut to produce a 2 cm×5 cm strip. A drop of water was placed on the surface with the overcoat layer formed of the coating agent, and then the surface was rubbed in one direction with an index finger until the liquid turned white. The water resistance of the thermal recording material was evaluated according to the following criteria based on the number of strokes needed to turn the liquid white.

A: The liquid does not turn white after 50 strokes or more.

B: The liquid turns white after 20 strokes or more and less than 50 strokes.

C: The liquid turns white after less than 20 strokes.

[Evaluation of Alcohol Resistance]

The thermal recording material was cut to produce a 2 cm×5 cm strip. The surface with the overcoat layer formed of the coating agent was gently wiped with absorbent cotton saturated with ethanol and was then dried. The alcohol resistance of the thermal recording material was evaluated according to the following criteria based on the coloring condition.

A: Coloring is hardly observed.

B: Black dots attributable to coloring are observed in some parts.

C: Black dots are observed all over the surface.

Examples 2 to 5 and Comparative Examples 1 to 3

Coating agents and thermal recording materials were produced in the same manner as in Example 1, except that the type and the amount of the modified PVAs (A) used and the amount of the crosslinking agent (B) were changed according to the conditions as described in Table 3. The methanol content of the coating agents and the water resistance and alcohol resistance of the thermal recording materials were evaluated in the same manner as in Example 1. The results are presented in Table 3.

TABLE 3

| | Coating agent | | | | Evaluation of coated product | |
|---|---|---|---|---|---|---|
| | Modified PVA (A) | agent (B) | Filler (C) | | Crosslinking | |
| | Type | Amount (parts by mass) | Amount (parts by mass) | Amount (parts by mass) | Methanol content (mass %) | Water resistance | Alcohol resistance |
| Example 1 | PVA-1 | 32 | 8 | 60 | 0.05 | A | B |
| Example 2 | PVA-2 | 30 | 10 | 60 | 0.08 | A | B |
| Example 3 | PVA-3 | 29 | 11 | 60 | 0.06 | A | A |
| Example 4 | PVA-4 | 30 | 10 | 60 | 0.04 | A | A |
| Example 5 | PVA-5 | 33 | 7 | 60 | 0.03 | A | A |
| Comparative Example 1 | PVA-6 | 32 | 8 | 60 | 0.08 | C | C |
| Comparative Example 2 | PVA-7 | 32 | 8 | 60 | 0.18 | A | A |
| Comparative Example 3 | PVA-8 | 32 | 8 | 60 | 0.05 | B | B |

Because an unmodified PVA was used in Comparative Example 1, the water resistance and alcohol resistance of the resulting thermal recording material were insufficient. As the methanol content in the modified PVA (A) was high in Comparative Example 2, the resulting coating agent had a high methanol content and was environmentally unfriendly in that methanol evaporated in the coating step. In Comparative Example 3, the amount of a component insoluble in the aqueous solution was too high in the modified PVA (A) to achieve sufficient water resistance of the thermal recording material.

Example 6

(Preparation of Adhesive)

Kaolin (product name: UW90; manufactured by Engelhald Corporation (today's BASF)) as the filler (C) was dispersed in water so that the concentration would be 25%. Subsequently, citric acid and PVA-1 were added to the dispersion, followed by heating under stirring and then stirring at 90° C. for a given time period to dissolve PVA-1. A crosslinking agent was added to the resulting liquid mixture at a solid content ratio of 0.1 parts by mass of citric acid to 12 parts by mass of PVA-1 to 37 parts by mass of kaolin as the filler (C) to 1.2 parts by mass of a boric acid as the crosslinking agent (B). An adhesive was thus prepared. The concentration of PVA-1 in the adhesive was 7.0 mass %. The methanol content in the adhesive measured in the manner described below was 0.04 mass %.

[Methanol Content in Adhesive]

The methanol content in the adhesive was determined by headspace gas chromatography in the manner described below.

<Creation of Standard Curve>

Three aqueous solutions of known methanol contents are prepared using isopropanol as an internal standard. A standard curve is created by measuring these aqueous solutions with a gas chromatography device (GC-2010, manufactured by Shimadzu Corporation) installed with a headspace sampler (Turbo Matrix HS40, manufactured by Parkin Elmer).

<Measurement of Methanol Content in Adhesive>

10 mg of the adhesive is weighed out and charged into a vial container. After placing and securely locking a cap on the vial container, the adhesive is subjected to headspace gas chromatography measurement. The methanol content in the adhesive is determined from the standard curve previously created.

[Evaluation of Coating Performance]

The adhesive was manually applied onto a sheet of A4 kraft paper using a wire bar #6. The coated surface was observed to evaluate the coating performance according to the following criteria.

A: The coated surface is free of defects.
B: The coated surface shows a few appearance defects such as a bump.
C: The coated surface shows a lot of appearance defects such as a bump.

[Evaluation of Adhesiveness]

The adhesive was manually applied onto a sheet of A4 kraft paper using a wire bar #6. To the A4 kraft paper was attached another sheet of A4 kraft paper, and, 10 seconds later, the two sheets of paper were separated by hand. The adhesive force was evaluated according to the following criteria. The larger a broken portion of the sheets of paper is, the higher the adhesiveness is.

A: 60% or more of the sheets of paper was broken.
B: 20% or more and less than 60% of the sheets of paper was broken.
C: Less than 20% of the sheets of paper was broken.

Examples 7 to 11 and Comparative Examples 4 to 6

Adhesives were produced in the same manner as in Example 6, except that the type and the amount of the modified PVA (A) used, the amount of the crosslinking agent (B), the amount of the filler (C), and whether or not a polyvinyl acetate emulsion is added were changed according to the conditions as described in Table 4. The methanol content, coating performance, and adhesiveness of the adhesives were evaluated in the same manner as in Example 6. The results are presented in Table 4.

TABLE 4

| | Adhesive | | | | | | |
|---|---|---|---|---|---|---|---|
| | Modified PVA (A) | | Crosslinking agent (B) | Filler (C) | Polyvinyl acetate emulsion | Methanol | Evaluation of adhesive | |
| | Type | Amount (parts by mass) | Amount (parts by mass) | Amount (parts by mass) | Amount (parts by mass) | content (mass %) | Coating performance | Adhesiveness |
| Example 6 | PVA-1 | 12 | 1.2 | 37 | 0 | 0.04 | A | B |
| Example 7 | PVA-2 | 10 | 1 | 37 | 0 | 0.06 | A | B |
| Example 8 | PVA-2 | 10 | 1 | 37 | 30 | 0.07 | A | A |
| Example 9 | PVA-3 | 7 | 0.7 | 37 | 0 | 0.05 | A | A |
| Example 10 | PVA-4 | 10 | 1 | 60 | 0 | 0.03 | A | A |
| Example 11 | PVA-5 | 13 | 1.3 | 60 | 0 | 0.02 | A | A |
| Comparative Example 4 | PVA-6 | 12 | 1.2 | 60 | 0 | 0.08 | C | C |
| Comparative Example 5 | PVA-7 | 12 | 1.2 | 60 | 0 | 0.15 | A | A |
| Comparative Example 6 | PVA-8 | 12 | 1.2 | 60 | 0 | 0.04 | C | B |

Because an unmodified PVA was used in Comparative Example 4, the coating performance and adhesiveness of the resulting adhesive were insufficient. As the methanol content in the modified PVA (A) was high in Comparative Example 5, the resulting coating agent had a high methanol content and was environmentally unfriendly in that methanol evaporated in the coating step. In Comparative Example 6, the amount of a component insoluble in the aqueous solution was too high in the modified PVA (A) to achieve sufficient coating performance of the adhesive.

INDUSTRIAL APPLICABILITY

Including the modified PVA (A) having a reduced methanol content and a reduced amount of a component insoluble in the aqueous solution, the coating agent and adhesive of the present invention are excellent in coating performance and adhesiveness. Coated products made by coating a substrate with the coating agent are excellent in water resistance and alcohol resistance.

The invention claimed is:

1. A coating agent, comprising a modified vinyl alcohol polymer (A), the modified vinyl alcohol polymer (A) comprising:

a structural unit derived from a derivative (a) of an ethylenically unsaturated dicarboxylic acid in a content (X) of 0.05 mol % or more and 10 mol % or less; wherein a degree of saponification of the modified vinyl alcohol polymer (A) is 80.0 mol % or more and 99.9 mol % or less, the modified vinyl alcohol polymer (A) is obtained in a particle form wherein 95 mass % or more passes through a sieve having 1.00 mm openings and 30 mass % or more passes through a sieve having 500 μm openings, the modified vinyl alcohol polymer (A) comprises an alcohol component, the alcohol component consists of methanol, a methanol content of the modified vinyl alcohol polymer (A) is less than 3.0 mass % as measured by headspace gas chromatography, and the modified vinyl alcohol polymer (A) comprises an amount of 0.1 ppm or more and less than 2,000 ppm of a component insoluble in a 90° C., 5 mass % aqueous solution.

2. The coating agent according to claim 1, wherein the derivative (a) of an ethylenically unsaturated dicarboxylic acid is a monoester, a diester, or an anhydride of an ethylenically unsaturated dicarboxylic acid.

3. The coating agent according to claim 1, wherein at least a part of the structural unit derived from the derivative (a) of an ethylenically unsaturated dicarboxylic acid is a structural unit represented by the following formula (I),

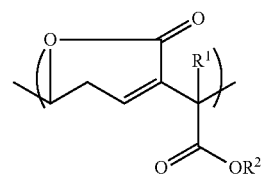

wherein $R^1$ is a hydrogen atom or a linear or branched alkyl group having 1 to 8 carbon atoms, and $R^2$ is a metal atom, a hydrogen atom, or a linear or branched alkyl group having 1 to 8 carbon atoms, and the following formula (Q) is satisfied, $$0.05 \leq Y/X < 0.98 \qquad (Q),$$

wherein X is the content of the structural unit derived from the derivative (a) of an ethylenically unsaturated dicarboxylic acid, and Y is the content of the structural unit represented by the formula (I).

4. The coating agent according to claim 1, further comprising a crosslinking agent (B).

5. The coating agent according to claim 1, further comprising a filler (C).

6. An adhesive comprising the coating agent according to claim 1.

7. A coated product made by coating a substrate with the coating agent according to claim 1.

8. The coated product according to claim 7, wherein the coated product is a thermal recording material.

9. The coated product according to claim 7, wherein the coated product is a base paper for release paper.

10. The coated product according to claim 7, wherein the coated product is a greaseproof paper.

11. The coated product according to claim 7, wherein the coated product is an inkjet recording material.

12. A facial tissue, comprising the adhesive according to claim 6.

13. A coating agent, comprising a modified vinyl alcohol polymer (A), the modified vinyl alcohol polymer (A) comprising:

a structural unit derived from a derivative (a) of an ethylenically unsaturated dicarboxylic acid in a content (X) of 0.05 mol % or more and 10 mol % or less; wherein a degree of saponification of the modified vinyl alcohol polymer (A) is 80.0 mol % or more and 99.9 mol % or less, the modified vinyl alcohol polymer (A) is obtained in a particle form wherein 95 mass % or more passes through a sieve having 1.00 mm openings and 30 mass % or more passes through a sieve having 500 μm openings, a methanol content of the modified vinyl alcohol polymer (A) is less than 3.0 mass % as measured by headspace gas chromatography, the modified vinyl alcohol polymer (A) does not comprise an alcohol having 2-3 carbons, and the modified vinyl alcohol polymer (A) comprises an amount of 0.1 ppm or more and less than 2,000 ppm of a component insoluble in a 90° C., 5 mass % aqueous solution.

* * * * *